United States Patent [19]

Welch et al.

[11] 4,328,200
[45] May 4, 1982

[54] PROCESS FOR PRODUCING CALCIUM HYPOCHLORITE

[75] Inventors: Cletus N. Welch, Clinton; Clifford E. Loehr, Norton; Roger A. Crawford, Wadsworth; John E. Carbaugh, Akron, all of Ohio

[73] Assignee: PPG Industries, Inc., Pittsburgh, Pa.

[21] Appl. No.: 269,241

[22] Filed: Jun. 1, 1981

[51] Int. Cl.$^3$ .......................................... C01B 11/06
[52] U.S. Cl. .................................................. 423/474
[58] Field of Search ............................... 423/474, 499

[56] References Cited

U.S. PATENT DOCUMENTS

| | | |
|---|---|---|
| 1,718,284 | 6/1929 | George et al. ........................ 423/474 |
| 1,718,285 | 6/1929 | George ................................. 423/474 |
| 1,937,613 | 12/1933 | Weber ................................... 423/474 |
| 2,007,429 | 7/1935 | Klopstock et al. .................. 423/474 |
| 2,368,042 | 1/1945 | Robson ................................. 423/474 |
| 2,441,337 | 5/1948 | Sprauer ................................ 423/474 |
| 2,469,901 | 5/1949 | Sprauer ................................ 423/474 |
| 3,251,647 | 5/1966 | Nicolaisen ........................... 423/474 |
| 3,572,989 | 3/1971 | Tatara et al. ........................ 423/474 |
| 3,767,775 | 10/1973 | Tatara ................................... 423/474 |
| 3,895,099 | 7/1975 | Sakowski ............................. 423/474 |
| 3,950,499 | 4/1976 | Miyashin ............................. 423/474 |
| 3,954,948 | 5/1976 | Sakowski ............................. 423/474 |
| 4,258,024 | 3/1981 | Hoffer .................................. 423/474 |

FOREIGN PATENT DOCUMENTS 1544268  4/1979  United Kingdom ............... 423/474

Primary Examiner—Brian E. Hearn
Attorney, Agent, or Firm—Irwin M. Stein

[57] ABSTRACT

A continuous integrated process for the production of calcium hypochlorite in which crystals of by-product sodium chloride are more easily separated for the calcium hypochlorite product is described. The process includes: (a) introducing with agitation into a vessel an aqueous slurry of dibasic calcium hypochlorite, sodium hydroxide, and aqueous salt solution saturated with calcium ion and sodium chloride in amounts at least sufficient to substantially dilute the sodium hydroxide; (b) forwarding the resulting aqueous mixture of step (a) to a chlorination zone containing a seed bed of calcium hypochlorite and sodium chloride crystals; (c) introducing chlorine into the chlorination zone, thereby producing an aqueous suspension containing further quantities of calcium hypochlorite crystals and readily separable significantly larger sodium chloride crystals; and (d) removing aqueous suspension containing such calcium hypochlorite and sodium chloride crystals from the chlorination zone to a classification zone. Calcium hypochlorite crystals are maintained in suspension in and removed from the upper portion of the classification zone; while the larger and more dense crystals of sodium chloride settle and are removed from the lower portion of said classification zone.

27 Claims, 1 Drawing Figure

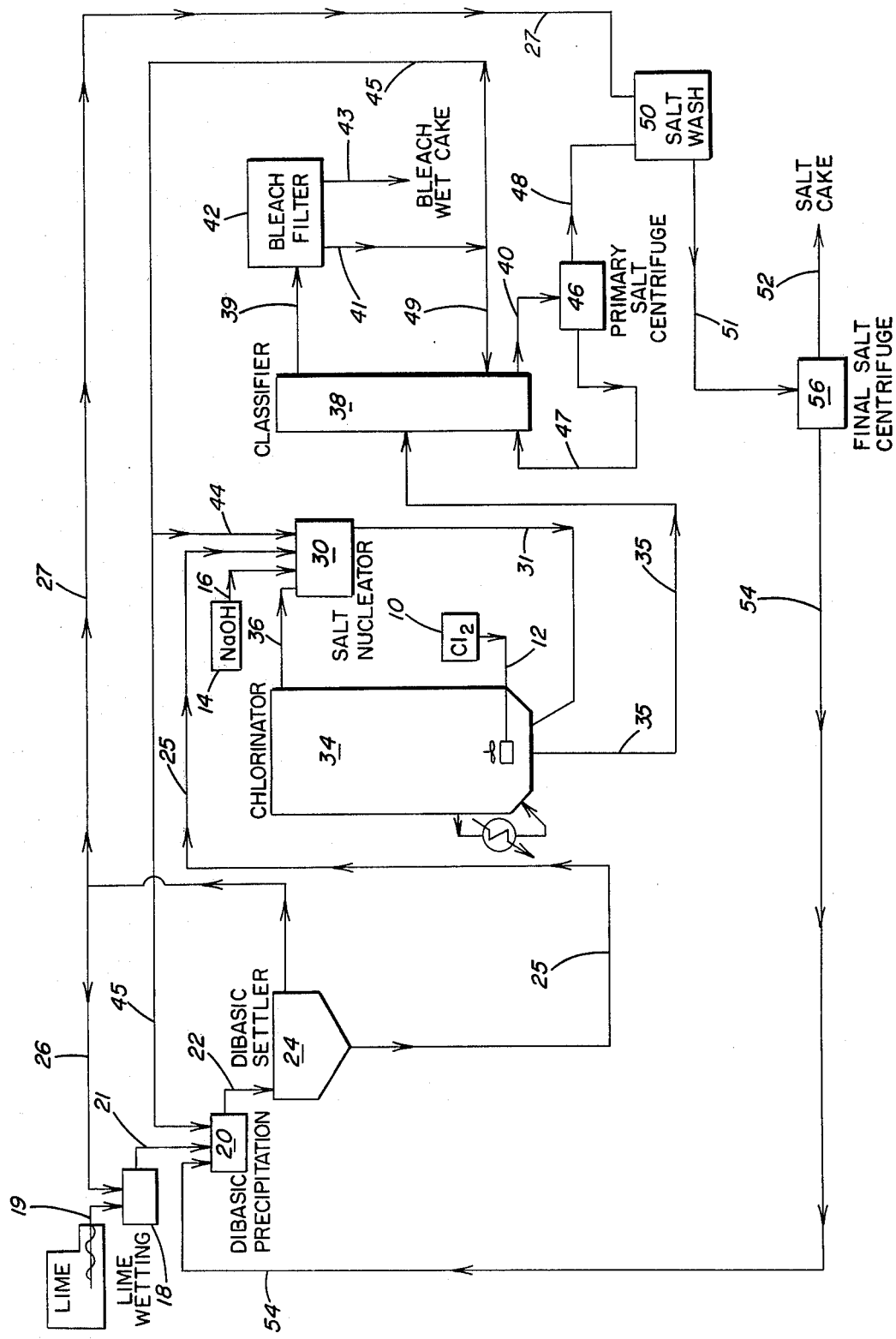

PROCESS FOR PRODUCING CALCIUM HYPOCHLORITE

DESCRIPTION OF THE INVENTION

The present invention relates to the manufacture of neutral calcium hypochlorite of high purity and available chlorine content by an improved continuous cyclic process. Calcium hypochlorite enjoys a major portion of the market for available chlorine compounds, aside from chlorine itself, because it is the cheapest and most stable solid composition known which delivers all of its available chlorine immediately on contact with oxidizable materials. Calcium hypochlorite compositions containing at least 65 percent of available chlorine have been on the market for many years and is used primarily as a commercial bleaching and sanitizing agent, particularly in the disinfection of swimming pool waters.

A variety of processes for manufacturing calcium hypochlorite from lime and alkali, e.g., sodium hydroxide, have been proposed. Most are directed to producing the best quality calcium hypochlorite product free of deleterious contaminants and diluents at the lowest possible cost. Others are designed to reduce waste materials resulting from the process. More recently, process modifications have been directed to eliminating the discharge of waste effluents from the process. Such a process for the manufacture of neutral calcium hypochlorite has been proposed in British Pat. No. 1,544,268.

The process described in the aforesaid British patent comprises reacting milk of lime with recycled mother liquor separated from the calcium hypochlorite product and/or sodium chloride product to form a suspension of dibasic calcium hypochlorite. This suspension is thickened and the thickened slurry of dibasic calcium hypochlorite is introduced into a chlorination zone together with separately introduced sodium hydroxide. Gaseous chlorine is introduced into the chlorination zone, which contains a bed of preformed crystals of neutral calcium hypochlorite and crystals of sodium chloride, whereby to form further separable crystals of neutral calcium hypochlorite and crystals of sodium chloride suspended in a mother liquor. Calcium hypochlorite and sodium chloride crystals are removed as a suspension in such mother liquor from the chlorination zone and separated. The process further describes complete recycling of the mother liquors produced in various stages of the process.

A key step in the multi-stage process described in British Pat. No. 1,544,268 for preparing neutral calcium hypochlorite of high purity and high available chlorine content is the separation step in which crystals of neutral calcium hypochlorite are separated from the crystals of sodium chloride. If an effective separation of the two crystal species is not made, the calcium hypochlorite product is found to contain too high a level of sodium chloride, which results in a product of lower purity and available chlorine content than commercially acceptable.

It has been found that the difference in size of the calcium hypochlorite crystals and sodium chloride crystals produced in accordance with the continuous process described in British Patent Specification No. 1,544,268 is not sufficiently large to readily achieve an effective separation of the two crystals, thereby making it difficult to produce a commercially acceptable calcium hypochlorite product. From the evidence at hand, it appears that the addition of sodium hydroxide to the chlorination zone results in the precipitation and formation of a large number of very small crystals of sodium chloride which are subsequently conveyed to the separation zone.

It has now been discovered that sodium chloride crystals having a size significantly larger than the calcium hypochlorite crystals produced in the chlorination zone can be formed by the multi-stage process hereinafter described. Such larger crystals of sodium chloride can be readily separated from the smaller agglomerated crystals of calcium hypochlorite because of this size difference and the difference in bulk density of the sodium chloride crystals compared to the particles of agglomerated calcium hypochlorite crystals. In particular, the process comprises a sequence of steps including:

(a) introducing with agitation into a vessel in the absence of added elemental chlorine:

(1) an aqueous slurry of dibasic calcium hypochlorite;
(2) a substantially stoichiometric amount of sodium hydroxide, basis the calcium hydroxide content of the aqueous dibasic calcium hypochlorite slurry introduced into the vessel; and
(3) an aqueous salt solution substantially saturated with calcium ion and sodium chloride in amounts sufficient to substantially dilute the sodium hydroxide introduced into said vessel;

(b) forwarding aqueous mixture prepared in step (a) to a chlorination zone containing a seed bed of preformed crystals of sodium chloride and neutral calcium hypochlorite in an aqueous chlorinator liquor;

(c) introducing elemental chlorine into the chlorination zone, thereby producing further neutral calcium hypochlorite crystals and sodium chloride crystals, said sodium chloride crystals being significantly larger than the calcium hypochlorite crystals;

(d) removing chlorinator liquor containing a suspension of calcium hypochlorite crystals and the larger sodium chloride crystals from the chlorination zone; and (e) separating said larger crystals of sodium chloride from said crystals of calcium hypochlorite in a separation zone to form an aqueous slurry rich in crystals of calcium hypochlorite and an aqueous slurry rich in crystals of sodium chloride.

BRIEF DESCRIPTION OF THE DRAWING

The specific features and advantages of the present invention will become more clear from the following detailed description made with reference to the drawing, which is a schematic flow diagram of the process steps of an embodiment of the present invention.

DETAILED DESCRIPTION OF THE INVENTION

Referring to the drawing, there is shown salt nucleator 30 into which is introduced an aqueous slurry of dibasic calcium hypochlorite, i.e., $Ca(OCl)_2 \cdot 2Ca(OH)_2$, by means of flow line 25. The dibasic salt serves as the source of lime for the subsequent chlorination step. Vessel 30 is a tank or other suitable container with agitation means for rapidly mixing the various reactant feed streams introduced therein into a well-stirred homogenous reactant mixture. Up to about 30, e.g., between about 20 and 25, weight percent of the lime in the slurry of dibasic calcium hypochlorite can be free lime (calcium hydroxide), i.e., it is not chemically present as the dibasic salt.

Sodium hydroxide from storage vessel 14 is introduced into salt nucleator vessel 30 by means of flow line 16 in substantially stoichiometric amounts based on the calcium hydroxide content of the dibasic calcium hypochlorite aqueous slurry charged to vessel 30. The aforesaid stoichiometric amounts of sodium hydroxide added to vessel 30 are typically in the range of from about 1.7 to 2.0, more typically from 1.8 to 1.9, moles of sodium hydroxide for each mole of calcium hydroxide introduced into the process in accordance with the overall following balanced equation:

$$Ca(OH)_2 + 2NaOH + 2Cl_2 \rightarrow Ca(OCl)_2 \cdot 2H_2O + 2NaCl$$

In an embodiment of the present process, a major portion of the calcium hydroxide introduced into vessel 30 is first converted in an earlier step to dibasic calcium hypochlorite. Consequently, the stoichiometric amounts of sodium hydroxide added to vessel 30 is based upon the total calcium hydroxide content (both chemically combined as the dibasic salt and chemically uncombined, i.e., as calcium hydroxide) of the dibasic calcium hypochlorite aqueous slurry introduced into vessel 30. In a preferred embodiment, the process is performed with slightly less than the stoichiometric amount of sodium hydroxide indicated in the aforesaid equation, i.e., less than a mole ratio of 2:1, to avoid the formation of sodium hypochlorite solids in the final product since sodium hypochlorite is much less stable than calcium hypochlorite in the solid state.

The concentration of the sodium hydroxide used will depend to a large extent on the amount of water make-up required for the process as a result of water removed from the system with the calcium hypochlorite wet cake by means of flow line 43, water removed with the sodium chloride salt cake by means of flow line 52 and losses which occur as a result of spills, evaporation from open tanks, etc. Typically, the concentration of sodium hydroxide will range between about 40 and 73 weight percent, more typically between about 50 and about 60, e.g., 55, weight percent. The sodium hydroxide can be added to vessel 30 in anhydrous form, if desired. In that case, water would be added separately to such vessel or elsewhere in the system.

Also added to salt nucleator 30 is an aqueous feed stream substantially saturated with calcium ion and sodium chloride. This aqueous salt solution is introduced into vessel 30 in amounts at least sufficient to substantially dilute the sodium hydroxide charged to vessel 30 in order to provide a low driving force for the formation of solid sodium chloride. Typically, the ratio of the volume of the aqueous diluting salt solution to the volume of the aqueous sodium hydroxide reactant feed stream is from about 10:1 to about 100:1, more typically from about 20:1 to about 50:1. Expressed differently, the concentration of sodium hydroxide added to vessel 30 is reduced quickly from the concentrated values previously described to less than about 3 weight percent, e.g., between about 0.5 and about 2.5, more commonly between about 1.0 and 1.8, weight percent. Preferably, the sodium hydroxide is charged slowly to vessel 30 to assist in avoiding localized high concentrations of sodium hydroxide for an extended period of time.

The aqueous diluting salt solution introduced into vessel 30 can be obtained from several sources in the present process. In accordance with one embodiment of the process, mother liquor from the aqueous slurry rich in calcium hypochlorite crystals is recycled to vessel 30 by means of flow line 44. In another embodiment, mother liquor from the aqueous slurry rich in sodium chloride crystals can be recycled to vessel 30. In a further embodiment, chlorinator liquor is withdrawn from the chlorinator and cycled to vessel 30 by means of flow line 36. In a still further embodiment (as shown in the drawing) more than one source of mother liquor is used to dilute the sodium hydroxide reactant feed stream.

The aforesaid mother liquors are substantially saturated with hypochlorite and sodium chloride at the temperatures of operation. Thus, they are substantially saturated with calcium ion, hypochlorite ion, sodium ion and chloride ion. The chlorinator liquor cycled to vessel 30 will also contain some solid sodium chloride and calcium hypochlorite as the chlorinator contains a suspension of such solids in that liquor.

From the evidence at hand, it is believed that a high localized concentration of sodium hydroxide in vessel 30 (or in the chlorinator) results in a high driving force for the formation of solid sodium chloride. With a high driving force, the rate of formation of solid sodium chloride (precipitation of sodium chloride) is relatively fast, thereby resulting in a relatively large number of small solid sodium chloride nuclei being formed. When a large number of such sodium chloride nuclei are formed, the crystals of sodium chloride do not grow sufficiently in size in the process to be readily separated in the later separation stage from the particles of agglomerated calcium hypochlorite crystals. Therefore, the sodium chloride content of the calcium hypochlorite product is increased, thereby decreasing the assay of the bleach product. On the other hand, when the driving force for formation of solid sodium chloride is low, the rate of formation of solid sodium chloride is relatively slow and a lesser number of sodium chloride nuclei is formed. Consequently, the crystals of sodium chloride grow larger. By low driving force is meant that the conditions in vessel 30 remain close to the equilibrium conditions established therein during steady state flow rates. Stated differently, by controlling the rate at which supersaturation occurs to a low level, the number of sodium chloride nuclei produced is correspondingly low and the number of sites upon which crystal growth can occur is limited.

Further, it has been found that the sodium hydroxide charged to vessel 30 reacts with calcium ion in the diluting aqueous salt solution to form sodium chloride and lime. Since the aqueous medium of the vessel is already substantially saturated in sodium chloride, the addition of sodium hydroxide thereto results in a solution supersaturated with respect to sodium chloride at the temperature of operation and, consequently, the precipitation of sodium chloride crystals therein. In the described process, the aqueous diluting salt solution(s) fed to salt nucleator 30 contain a sufficient amount of calcium and chloride ions to react with substantially all of the sodium hydroxide added to that vessel. Consequently, little or no sodium hydroxide (as such) is forwarded to chlorinator 34 from vessel 30.

An added benefit of the reaction of sodium hydroxide in vessel 30 is that chlorination of substantially one chlorinatable specie, i.e., calcium hydroxide, occurs in the chlorinator, i.e., the competing chlorination of sodium hydroxide is substantially absent. The source of the chlorinatable calcium hydroxide is the free lime in the aqueous dibasic salt slurry and the calcium hydroxide portion of the dibasic salt.

Salt nucleator 30 typically has a volume substantially smaller than chlorinator vessel 34. Typically, the volume of the chlorinator will be 10 to 200, e.g., 15 to 40, times as large as the volume of vessel 30. Vessel 30 is equipped with agitator means so that the dibasic calcium hypochlorite slurry, sodium hydroxide and aqueous diluting salt solution feed stream(s) charged thereto can be readily admixed to form a well-stirred homogeneous mixture in a relatively short time. Unlike the chlorinator, wherein mixing is conducted in a moderate fashion to avoid breaking the more fragile calcium hypochlorite crystals and avoid breakthrough of unreacted elemental chlorine, mixing in vessel 30 can be performed vigorously to achieve rapid admixing of the feed streams to a homogeneous mixture, thereby reducing the driving force for formation of sodium chloride nuclei. If desired, the homogeneous mixture in vessel 30 can be maintained therein for a residence time sufficient to allow free lime charged thereto or formed therein to form further dibasic salt by reaction with available calcium hypochlorite introduced by means of the aqueous salt solution. In such an embodiment, the aqueous salt solution is introduced into vessel 30 in amounts sufficient to provide at least the requisite stoichiometric amount of calcium hypochlorite to form the dibasic salt with the uncombined lime in vessel 30.

Addition of sodium hydroxide to vessel 30 has an additional advantage due to the use of concentrated sodium hydroxide solutions in the process. Since, for example, a 60 percent sodium hydroxide solution freezes at about 53.3° C. (128° F.), it is difficult to obtain good dispersion of such a solution in the chlorinator, which is commonly maintained at between 15° and 20° C., especially when the sodium hydroxide is introduced below the surface of the reaction mixture. On the other hand, vessel 30 can be operated at temperatures higher than 20° C. Further, dispersion of sodium hydroxide can be achieved more readily in the smaller salt nucleator vessel than in the larger chlorination vessel, as previously described, and the sodium hydroxide can be introduced onto the top of the mixture in vessel 30 (rather than beneath the surface) because of the more vigorous agitation used in that vessel.

The temperature of vessel 30 is typically about room temperature, e.g., between about 15° C. and 35° C., usually between about 20° C. and 30° C. The temperature is not controlled at any particular value; but, is a function of the temperature and quantity of the reactant and recycle feed streams charged to it and the surrounding ambient temperature. Thus, the temperature of the reaction mixture in salt nucleator 30 is allowed to reach whatever temperature equilibrium conditions dictate. Since the volume of recycle mother liquors charged to the vessel are relatively large and relatively cool, the temperature of the mixture in vessel 30 will typically be in the described range.

The aqueous homogenous reaction mixture prepared in vessel 30 is removed therefrom and forwarded by flow line 31 to chlorinator 34. The average residence time of the reaction mixture in vessel 30 is relatively short, i.e., on the average of from about 2 to about 12, e.g., from about 4 to 8, minutes; however, it can be longer if desired.

Elemental chlorine from source 10 is forwarded by means of flow line 12 to chlorinator 34, which contains agitator means for moderately mixing the liquid reaction mixture therein. Elemental chlorine (liquid or gaseous) is introduced into chlorinator 34 in a manner to effectively disperse the chlorine within the chlorination zone of the chlorinator and effect complete reaction of the chlorine with the alkali content, i.e., the hydroxide ion concentration, e.g., calcium hydroxide, within the chlorinator. The amount of chlorine introduced into chlorinator 34 is that amount which is required stoichiometrically to react with from about 93 percent to about 99 percent, preferably 96 percent to 99 percent, of the total alkali content of the reaction mixture. Preferably, the reaction mixture is maintained slightly alkaline to avoid decomposition of calcium hypochlorite. Moreover, use of an excess of chlorine (to achieve 100% reaction of the alkali) is not encouraged for the reason that it can result in incomplete utilization of the chlorine added and breakthrough of unreacted chlorine to the vapor space above the liquid level within the chlorinator. Such non-utilized chlorine requires disposal or recycling to the chlorinator which adds to the investment costs of the process. The feed rate of elemental chlorine to the chlorinator is preferably maintained as fast as possible but not so fast as to result in incomplete utilization of chlorine within the reaction mixture.

The design of the chlorinator vessel is not critical to the invention described herein. A chlorinator which has been found to be useful in the described process is one which is in the form of a cylindrical vessel with a draft tube containing an agitator. The chlorine is introduced beneath the impeller of the agitator within the draft tube and is, thereby, effectively dispersed within the chlorinator. The chlorinator vessel should be of a size sufficient to permit an adequate average residence time therein of the reaction mixture. Residence times of from about 5 to 10 hours are contemplated.

The temperature of the reaction mixture within the chlorinator is typically maintained at less than 35° C., e.g., between about 10° C. and about 30° C., preferably between about 15° C. and about 20° C., by employing auxiliary cooling means, e.g., indirect heat exchangers. Such heat exchangers can be located within the chlorinator or external thereto, e.g., by use of a side arm cooler. Temperatures of more than about 30° C.–35° C. result in accelerating losses of calcium hypochlorite by decomposition.

Chlorination of the reaction mixture introduced into chlorinator 34 from vessel 30 results in the formation of further crystals of calcium hypochlorite and sodium chloride and the growth of preexisting crystals of the aforesaid chemical species. Chlorination is conducted in the presence of a preformed seed bed of calcium hypochlorite and sodium chloride crystals which are present in the chlorinator. Such seed crystals are typically of the same size range as the calcium hypochlorite product and by-product salt described hereinafter. Thus, precipitation and growth of newly formed crystals occurs in the presence of and on the surfaces of previously formed crystals, thereby allowing the growth of product calcium hypochlorite and by-product sodium chloride to their relative appropriate sizes. In this way, further separable and recoverable amounts of the desired neutral calcium hypochloride are produced.

When starting the process for the first time, the chlorinator can be filled partially, e.g., about one-half full, or to the top of the draft tube with a synthetic aqueous reaction mixture, e.g., an aqueous solution saturated with calcium hypochlorite and sodium chloride. An appropriate amount of solid calcium hypochlorite and sodium chloride particles can also be added to serve as a seed bed. The reaction mixture from vessel 30 and chlorine are then added simultaneously to the chlorinator. Product is then withdrawn to the subsequent stages of the process. When re-starting the process after a shut down and cleaning of the chlorinator, the chlorinator can be partially filled with a synthetically prepared aqueous liquid reaction mixture and a heel of preformed crystals of calcium hypochlorite and sodium chloride obtained from the process prior to shut down added to the synthetic reaction mixture. The process is then operated as described with respect to an initial start-up.

The neutral calcium hypochlorite crystals formed in the chlorinator in accordance with the present process typically range in size between about submicron and 20 microns and have a lamellar tetragonal crystal habit. The majority will have a crystal size of between about 1 and 10 microns. The crystals of sodium chloride formed in the present process have a cubic crystal habit and typically range in size between about 50 and 400 microns. The majority of the salt crystals have a crystal size of between about 125 and 290 microns.

The weight mean average particle size of sodium chloride crystals removed from classifier 38 in the present process is greater than 160 microns, e.g., between about 180 and 350 microns, more typically between 190 and 300 microns. When the salt crystals are within the aforesaid size range, they are readily separable from the relatively smaller calcium hypochlorite particles removed from classifier 38, which particles are agglomerates of calcium hypochlorite crystals. These particles typically have a weight mean average particle size of between about 30 microns and 100 microns, more typically between about 50 and 70 microns. Accordingly, the weight mean average particle size of the separated sodium chloride crystals is at least 60, more typically at least 90, microns larger than the weight mean average particle size of the calcium hypochlorite particles produced in the process. This weight mean size differential can be as high as 300 microns, or higher. Thus, the aforesaid size differential will typically range between 60 and 300 microns, e.g., between about 100 and 200 microns.

A product stream comprising sodium chloride crystals, neutral calcium hypochlorite particles and suspending chlorinator liquor is removed from chlorinator 34 via flow line 35 and conveyed to classifier 38 wherein the crystals of sodium chloride are separated from the particles of calcium hypochlorite. Removal of the product stream from chlorinator 34 can be on a batch or continuous basis. Preferably, the process is operated continuously. The rate at which product is removed will depend on the rated capacity of the plant and the residence time in the chlorinator. Typically, from about 5 to about 25 percent, e.g., 10 to 20 percent, of the volume of the chlorinator is removed per hour of continuous operation. On a batch basis, from about 40 to 60 percent of the chlorinator volume is removed at any one draining.

Any of the commonly known methods for separating solids of different sizes suspended in a liquid medium can be used to separate the crystals of sodium chloride from the particles of calcium hypochlorite. Examples of techniques which can be used include flotation, decantation, hydrocloning, gravity separation, or any other separation method which utilizes the difference in size and/or bulk density of the two crystal species produced in the chlorinator. Preferably, a gravity classifier of the up-flow type is employed, i.e., a classifier operating by an elutriation/sedimentation technique. In such a classifier, the calcium hypochlorite particles are maintained in suspension in mother liquor present in the upper portion of the classifying zone and a bed of larger, heavier sodium chloride crystals maintained in the lower portion of the classifying zone. The aforesaid elutriation classifier and its operation is the subject of a separate co-assigned patent application.

An aqueous slurry rich in calcium hypochlorite particles is removed from the upper portion of classifier 38 by means of flow line 39 and forwarded to filter means 42. The solid phase of the slurry removed from the upper portion of the classifier is predominantly calcium hypochlorite. Mother liquor associated with the calcium hypochlorite particles is separated therefrom in filter means 42 in a manner known in the art and removed by means of flow line 41. A portion of this bleach filter mother liquor is recycled to classifier 38 by means of flow line 49 to serve as elutriating fluid, which flows upwardly in the classifier at a rate less than the force required to maintain in suspension the larger downwardly flowing sodium chloride crystals. A further portion of the bleach filter mother liquor is recycled by means of flow line 45 and used for the preparation of further dibasic calcium hypochlorite reactant because of its high calcium hypochlorite concentration. A portion of this stream of recycled bleach filter mother liquor is forwarded by flow line 44 to salt nucleator 30 to serve as sodium hydroxide diluting liquid.

Wet calcium hypochlorite filter cake is removed from filter means 42 via flow line 43 and dried with dry air. Moist cake from filter means 42 contains from about 45 to about 55 percent by weight of calcium hypochlorite, from about 8 to about 12 percent by weight of sodium chloride, and from about 30 to about 40 percent by weight of water. Preferably, the weight ratio of calcium hypochlorite to sodium chloride in the moist cake is at least about 4.2:1. This moist cake can be used directly in the treatment of water systems, such as swimming pools and the like; but, is generally dried and stored prior to use. The moist cake is dried by conventional known means, for example, using a turbo dryer, fluid bed dryer, or vacuum dryer in a known manner where appropriate temperature ranges are employed to quickly reduce the water content of the wet filter cake to the desired level.

In the process of the present invention, the neutral calcium hypochlorite-containing moist cake is dried with hot, e.g., 330°–350° F. (166°–177° C.), dry air while maintaining the product temperature in the range of from about 60° F. (15.6° C.) to about 180° F. (82° C.) and preferably from about 75° F. (24° C.) to about 120° F. (49° C.) to give a calcium hypochlorite product having at least 65 weight percent available chlorine (as calcium hypochlorite) and a water content of from about 2 to about 12 percent by weight, the bulk of the remaining contents being sodium chloride.

Any means suitable for separating bleach filter mother liquor from the slurry of calcium hypochlorite particles withdrawn from classifier 38 can be used. It is important that the selected means removes sufficient quantities of the entrained mother liquor from the calcium hypochlorite particles. Since the concentration of sodium chloride within the mother liquor is about twice that of calcium hypochlorite, drying of a calcium hypochlorite filter cake containing a high percentage of retained mother liquor reduces the assay of the dried product and can result in the production of a calcium hypochlorite having an available chlorine content less than the desired commercial value, e.g., 65 percent.

Further, retention of large amounts of water with the calcium hypochlorite product increases the evaporation (drying) load of the process and adversely affects the economics of the process. Useful filtration equipment for separating calcium hypochlorite crystals from its entraining mother liquor include a centrifuge plate and frame filters or other similar solid-liquid separating means. Preferably, high pressure expression equipment such as a tube filter press, piston filter press or membrane filter is used. A membrane filter press has been found particularly useful, and the use and operation of such equipment is the subject of a separate co-assigned U.S. patent application.

A slurry of sodium chloride crystals which has settled counter-currently to the bottom of the classifier 38 is removed therefrom by means of flow line 40 and forwarded to solid-liquid separation means, i.e., primary salt centrifuge 46, wherein mother liquor associated with the sodium chloride crystals is separated therefrom. This mother liquor is removed from centrifuge 46 by means of flow line 47 and recycled to the bottom of classifier 38 by means of flow line 47 to serve as a carrier liquor to assist in the removal of the solid sodium chloride crystals from the classifier.

The wet sodium chloride crystals removed from centrifuge 46 are forwarded to salt wash tank 50 by means of flow line 48 wherein the crystals are washed with an aqueous solution obtained from the preparation of the dibasic calcium hypochlorite reactant and conveyed to wash tank 50 by means of flow line 27. This wash solution is unsaturated in calcium hypochlorite so that it is capable of dissolving solid calcium hypochlorite and removing calcium hypochlorite-containing mother liquor retained by the sodium chloride crystals, thereby producing a relatively pure sodium chloride.

The slurry of washed sodium chloride by-product is forwarded from wash tank 50 by means of flow line 51 to solid-liquid separating means, e.g., final salt centrifuge 56, wherein the salt wash liquor is separated from the sodium chloride crystals. Wet sodium chloride of relatively high assay is removed from centrifuge 56 by means of flow line 52. The salt recovered from the process can be used to prepare salt solutions capable of being electrolyzed to produce sodium hydroxide and chlorine, which can be used as reactants in the present process. Typically, the by-product salt contains less than 2 percent, e.g., from 1 to 2 percent of calcium hypochlorite. The salt wash liquor is removed from final salt centrifuge 56 by means of flow line 54 and recycled for use in the preparation of dibasic calcium hypochlorite reactant because of its high concentration of calcium hypochlorite. Any separating means suitable for separating the salt crystals from its entraining mother liquor or the wash liquor can be used. Such separating means include a centrifuge, conventional plate and frame filter, or any similar solid-liquid separating means.

Referring again to the drawing, lime is introduced into mixing tank 18 by means of flow line 19 wherein it is admixed with a portion of the overflow mother liquor from settler 24 forwarded by flow line 26 to form a smooth relatively lump-free milk of lime. The remaining portion of this mother liquor overflow is forwarded by means of flow line 27 to sodium chloride by-product wash tank 50, as previously described.

The lime used to prepare the milk of lime in mix tank 18 preferably contains a minimum amount of impurities. Preferably, the lime contains between about 90 and about 97 percent by weight of active lime, e.g., calcium hydroxide. A typical lime useful in the present process has the following analysis:

$Ca(OH)_2$—97.11
$CaCO_3$—1.00
$CaSO_4$—0.08
$SiO_2$—0.45
$Al_2O_3$—0.25
$Fe_2O_3$—0.06
$MgO$—0.05
$H_2O$—0.60

The milk of lime prepared in mix tank 18 is forwarded by flow line 21 to mix tank 20 wherein it is fortified with salt wash mother liquor recycled by means of flow line 54 and originating from washing the by-product sodium chloride salt, and with bleach filter mother liquor recycled by means of flow line 45 and originating from calcium hypochlorite filter means 42. The calcium hypochlorite concentration in the recycled mother liquors used to fortify the milk of lime is sufficient to form and precipitate the dibasic double salt, i.e., $Ca(OCl)_2 \cdot 2Ca(OH)_2$. Dibasic calcium hypochlorite salt slurry is removed from mix tank 20 through flow line 22 and forwarded to settler 24. In settler 24, partial separation of the mother liquor from the dibasic salt occurs by gravity sedimentation. The settler typically has a large diameter to height ratio because sedimentation of the dibasic salt takes place slowly. The underflow from settler 24 is removed and forwarded by means of flow line 25 to salt nucleator 30, as heretofore described. The total solids concentration in the settler is increased from about 8 weight percent in the feed to the settler to about 13-20 weight percent, e.g., about 15 to 17 weight percent in the underflow.

The present invention is more particularly described in the following Example which is intended as illustrative only since numerous modifications and variations therein will be apparent to those skilled in the art. In that Example, all percentages are by weight. Flow rates and other values are average values reflecting normal fluctuations in a continuous process.

EXAMPLE

A slurry of dibasic calcium hypochlorite was charged to chlorinator 34 which initially contained chlorinator liquor, at a rate of about 195 grams per minute (gpm). The dibasic slurry contained about 9.2% calcium hypochlorite, 90% calcium hydroxide, 17.8% sodium chloride and 61.6% water—the remainder being composed essentially of calcium chlorate, calcium chloride and calcium carbonate. The chlorinator liquor contained about 15.5% calcium hypochlorite, 19.7% sodium chloride and 61.6% water—the remainder being composed essentially of the other chemical species described with respect to the aforesaid dibasic slurry. Hereinafter, only percentages of the major components will be described. The contents of the chlorinator were maintained at about 18° C. by cooling means external to the chlorinator and were agitated with a propeller type agitator.

Sodium hydroxide (as a 50% solution) was charged to the chlorinator at a rate of about 34.5 gpm by means of a dip tube inserted at the top of the chlorinator. Mother liquor separated from the calcium hypochlorite product in filter 42 was charged to the chlorinator at a rate of 90 gpm. This mother liquor stream contained about 8.7% calcium hypochlorite, 19.5% sodium chloride and 69.5% water. Gaseous elemental chlorine was fed to the chlorinator as required to maintain the pH of the reaction mixture at about 9.65.

A slurry of chlorinator liquor was withdrawn batchwise from the bottom of the chlorinator at a rate of 10,500 grams about every ½ hour and forwarded to a tank which feeds classifier 38 at a rate of 350 gpm. A slurry rich in calcium hypochlorite solids was removed from the top to the classifier at a rate of 390 gpm and forwarded to filter 42. This slurry contained about 15.7% calcium hypochlorite, 17.9% sodium chloride and 63.4% water. After separation of the solids in the slurry, i.e., calcium hypochlorite, a portion of the resulting mother liquor was returned to the chlorinator (as previously described) and a further portion returned to the classifier at a rate of about 70 gpm.

A slurry rich in sodium chloride solids was removed from the bottom of the classifier and conveyed to centrifuge 46 at a rate of about 530 gpm. This slurry contained about 9.9% calcium hypochlorite, 22.8% sodium chloride and 64.3% water. After separation of the solids in the salt rich slurry, the resulting mother liquor was returned to the bottom of the classifier at a rate of 500 gpm as a carrier liquor for the settled salt in the classifier.

The process was operated in this manner for about 50 hours. Samples of sodium chloride salt taken from chlorinator 34 during this period exhibited a weight mean average particle size that ranged between about 115 and 140 microns with an overall average of about 125 microns. The weight mean average of the particles of calcium hypochlorite product recovered in the same period ranged between about 50 and about 90 microns.

Following the aforesaid period of operation, the process streams were altered in the following manner. The sodium hydroxide, dibasic calcium hypochlorite slurry and mother liquor from the calcium hypochlorite product, which previously were separately charged directly to the chlorinator were now introduced into salt nucleator 30 at the same flow rates as the aforesaid period of operation along with a recycle stream from the chlorinator 34 at a rate of 1200 gpm and the resulting well stirred mixture conveyed to the chlorinator after an average residence time of about ten minutes. The process was operated as before.

After about 16 hours of operation, the weight mean average particle size of the by-product sodium chloride had increased to about 160 microns. Twenty four hours later the weight mean average had increased to about 190 microns. During this period the weight mean average particle size of the calcium hypochlorite was about 50 to 90 microns.

The aforesaid Example demonstrates that admixture of sodium hydroxide in the salt nucleator of the described process with a slurry of dibasic calcium hypochlorite and aqueous salt solution saturated with calcium hypochlorite and sodium chloride results in the production of larger sodium chloride salt crystals than when such reactant streams are separately introduced directly into the chlorinator, which salt crystals are more readily separable from the calcium hypochlorite product.

Although the present process has been described with reference to specific details of certain embodiments thereof, it is not intended that such details should be regarded as limitations upon the scope of the invention except as and to the extent that they are included in the accompanying claims.

We claim:

1. In the process of producing neutral calcium hypochlorite by chlorination of an aqueous slurry of dibasic calcium hypochlorite, the improvement which comprises the steps of:
    (a) introducing with agitation into a vessel in the absence of added elemental chlorine (1) aqueous slurry of dibasic calcium hypochlorite, (2) substantially stoichiometric amounts of sodium hydroxide, basis the calcium hydroxide content of the dibasic calcium hypochlorite aqueous slurry introduced into said vessel, and (3) aqueous salt solution in amounts at least sufficient to substantially dilute the sodium hydroxide introduced into said vessel, said aqueous salt solution being substantially saturated with calcium ion and sodium chloride;
    (b) forwarding aqueous mixture prepared in step (a) to a chlorination zone in a chlorinator containing a seed bed of crystals of sodium chloride and crystals of neutral calcium hypochlorite in an aqueous chlorinator liquor maintained at temperatures less than about 35° C.;
    (c) introducing chlorine into the chlorination zone;
    (d) removing from the chlorinator, chlorinator liquor containing a suspension of calcium hypochlorite particles and sodium chloride crystals significantly larger than the calcium hypochlorite particles; and
    (e) separating said larger crystals of sodium chloride from said particles of calcium hypochlorite, thereby forming an aqueous slurry rich in particles of calcium hypochlorite and an aqueous slurry rich in crystals of sodium chloride.

2. The process of claim 1 wherein mother liquor originating from a source selected from the group consisting of aqueous slurry rich in particles of calcium hypochlorite and aqueous slurry rich in crystals of sodium chloride is recycled to step (a) as aqueous salt solution for diluting said sodium hydroxide.

3. The process of claim 1 wherein chlorinator liquor from the chlorinator is cycled to the vessel of step (a) as aqueous salt solution for diluting said sodium hydroxide.

4. The process of claim 1 wherein the aqueous salt solution for diluting the sodium hydroxide originates both from mother liquor recycled from the aqueous slurry rich in particles of calcium hypochlorite and chlorinator mother liquor from the chlorinator.

5. The process of claims 1, 2, 3, or 4 wherein the ratio of the volume of the aqueous salt solution to the volume of sodium hydroxide added to the vessel of step (a) is from about 10:1 to about 100:1.

6. The process of claim 5 wherein the aqueous salt solution contains sufficient calcium ions to react with substantially all of the sodium hydroxide introduced into the vessel of step (a).

7. The process of claims 1, 2, 3 or 4 wherein the sodium hydroxide added to the vessel of step (a) is an aqueous solution having a concentration of from about 40 to about 73 weight percent.

8. The process of claim 7 wherein the concentration of the sodium hydroxide added to the vessel of step (a) is diluted in that vessel to a concentration of less than about 3 weight percent.

9. The process of claim 1 wherein the weight mean average of the separated sodium chloride crystals is at least 60 microns larger than the weight mean average of the calcium hypochlorite particles.

10. A continuous process for producing calcium hypochlorite, which comprises the steps of:

(a) introducing with agitation into a vessel in the absence of added elemental chlorine the following reactant feed streams:
  (1) aqueous slurry of dibasic calcium hypochlorite.
  (2) aqueous solution of sodium hydroxide in amounts equal to from about 1.7 to about 2.0 moles of sodium hydroxide per mole of calcium hydroxide in the dibasic calcium hypochlorite slurry feed stream, and
  (3) aqueous salt solution substantially saturated with calcium ion and sodium chloride, the ratio of the volume of aqueous salt solution to the volume of aqueous sodium hydroxide being from about 10:1 to about 100:1;
(b) forwarding aqueous reactant mixture prepared in step (a) to a chlorination zone in a chlorinator containing a seed bed of crystals of sodium chloride and crystals of neutral calcium hypochlorite in aqueous chlorinator liquor maintained at temperatures of from about 10° C. to about 30° C.;
(c) introducing chlorine into the chlorination zone in amounts sufficient to react with from about 93 to about 99 percent of the total alkali content of the aqueous reactant mixture introduced into the chlorination zone;
(d) removing chlorinator liquor containing a suspension of calcium hypochlorite particles and sodium chloride crystals having a weight mean average particle size at least 60 microns larger than the weight mean average particle size of the calcium hypochlorite particles; and
(e) separating said larger crystals of sodium chloride from said particles of calcium hypochlorite, thereby forming an aqueous slurry rich in particles of calcium hypochlorite and an aqueous slurry rich in crystals of sodium chloride.

11. The process of claim 10 wherein the aqueous slurry of dibasic calcium hypochlorite contains up to about 30 weight percent of free lime.

12. The process of claim 11 wherein from about 1.8 to about 1.9 moles of sodium hydroxide per mole of calcium hydroxide in the dibasic calcium hypochlorite slurry feed stream is used.

13. The process of claim 10 wherein the concentration of the aqueous sodium hydroxide solution is from about 50 to about 60 weight percent.

14. The process of claim 10 wherein the ratio of the volume of aqueous salt solution to the volume of aqueous sodium hydroxide is from about 20:1 to about 50:1.

15. The process of claims 10, 11 or 14 wherein the aqueous salt solution introduced into the vessel of step (a) is obtained from a source selected from the group consisting of:
  (a) mother liquor originating from the aqueous slurry rich in particles of calcium hypochlorite,
  (b) mother liquor originating from the aqueous slurry rich in crystals of sodium chloride,
  (c) chlorinator liquor from the chlorinator, and
  (d) mixtures of such mother liquors and chlorinator liquor.

16. The process of claim 15 wherein the aqueous salt solution contains sufficient calcium ions to react with substantially all of the sodium hydroxide introduced into the mixing vessel of step (a).

17. The process of claim 15 wherein the weight mean average particle size of the sodium chloride crystals removed from the chlorinator is from about 100 to about 200 microns larger than the weight mean average particle size of the calcium hypochlorite particles.

18. The process of claim 15 wherein the concentration of the aqueous sodium hydroxide solution added to the vessel of step (a) is diluted in that vessel to less than about 3 weight percent.

19. The process of claim 18 wherein the concentration of the aqueous sodium hydroxide solution added to the vessel of step (a) is diluted in that vessel to between about 0.5 and 2.5 weight percent.

20. The process of claim 10 wherein the aqueous slurry rich in particles of calcium hypochlorite is separated into a calcium hypochlorite wet cake and a bleach mother liquor.

21. The process of claim 10 wherein the aqueous slurry rich in particles of sodium chloride is separated into a sodium chloride wet cake and mother liquor, and the sodium chloride wet cake washed with an aqueous solution unsaturated in calcium hypochlorite to form a washed sodium chloride cake and sodium chloride wash mother liquor.

22. The process of claims 20 or 21 wherein bleach mother liquor and sodium chloride wash mother liquor are mixed with milk of lime to produce an aqueous slurry containing dibasic calcium hypochlorite.

23. The process of claim 22 wherein the dibasic calcium hypochlorite containing slurry is settled and underflow originating from the settler is forwarded to the vessel of step (a) as aqueous slurry of dibasic calcium hypochlorite reactant feed stream.

24. The process of claim 23 wherein a portion of the overflow liquor from the settler is used to wash the sodium chloride wet cake.

25. The process of claim 23 wherein a portion of the overflow liquor from the settler is mixed with lime to form milk of lime.

26. In the process of producing neutral calcium hypochlorite from dibasic calcium hypochlorite, sodium hydroxide and chlorine, the improvement which comprises: admixing in the absence of added elemental chlorine (a) an aqueous slurry of dibasic calcium hypochlorite, (b) a substantially stoichiometric amount of sodium hydroxide, basis the calcium hydroxide content of the aqueous slurry, and (c) aqueous salt solution in amounts at least sufficient to substantially dilute the sodium hydroxide, said aqueous salt solution being substantially saturated with calcium ion and sodium chloride, and thereafter adding chlorine to the resulting aqueous admixture in the presence of a seed bed of sodium chloride crystals and neutral calcium hypochlorite crystals at temperatures at which loss of calcium hypochlorite by accelerated decomposition is avoided, thereby forming an aqueous medium containing a suspension of calcium hypochlorite crystals and sodium chloride crystals in which the sodium chloride crystals are sufficiently larger than the calcium hypochlorite crystals to allow for ready separation of said crystals.

27. In the process of producing neutral calcium hypochlorite from dibasic calcium hypochlorite, sodium hydroxide and chlorine, the improvement which comprises admixing in the absence of added elemental chlorine (a) an aqueous slurry of dibasic calcium hypochlorite, (b) a substantially stoichiometric amount of sodium hydroxide, basis the calcium hydroxide content of the aqueous slurry, and (c) aqueous diluting salt solution containing sufficient amount of calcium ions to react with substantially all of said sodium hydroxide and being substantially saturated with sodium chloride, and thereafter adding chlorine to the resulting aqueous admixture in the presence of a seed bed of sodium chloride crystals and neutral calcium hypochlorite crystals at temperatures at which loss of calcium hypochlorite by accelerated decomposition is avoided, thereby forming an aqueous medium containing a suspension of agglomerated calcium hypochlorite crystals and sodium chloride crystals in which the sodium chloride crystals are sufficiently larger than the agglomerated calcium hypochlorite crystals to allow for ready separation of said crystals.

* * * * *